March 25, 1969 J. PESCHON ET AL 3,435,194

COMPUTER FOR THE APPROXIMATION OF THE CORRELATION BETWEEN SIGNALS

Filed May 11, 1966

INVENTORS
JOHN PESCHON
ROBERT E. LARSON
BY Samuel Lindenberg
Arthur Frolich
Abraham Wasserman
ATTORNEYS

United States Patent Office 3,435,194

Patented Mar. 25, 1969

3,435,194

COMPUTER FOR THE APPROXIMATION OF THE CORRELATION BETWEEN SIGNALS

John Peschon and Robert E. Larson, Los Altos, Calif., assignors to Stanford Research Institute, Menlo Park, Calif., a corporation of California Filed May 11, 1966, Ser. No. 549,298
Int. Cl. G06f 15/34; G06g 7/19, 7/18
U.S. Cl. 235—181 8 Claims This invention relates to computing circuitry and more particularly to a correlation computer.

Figure 1:
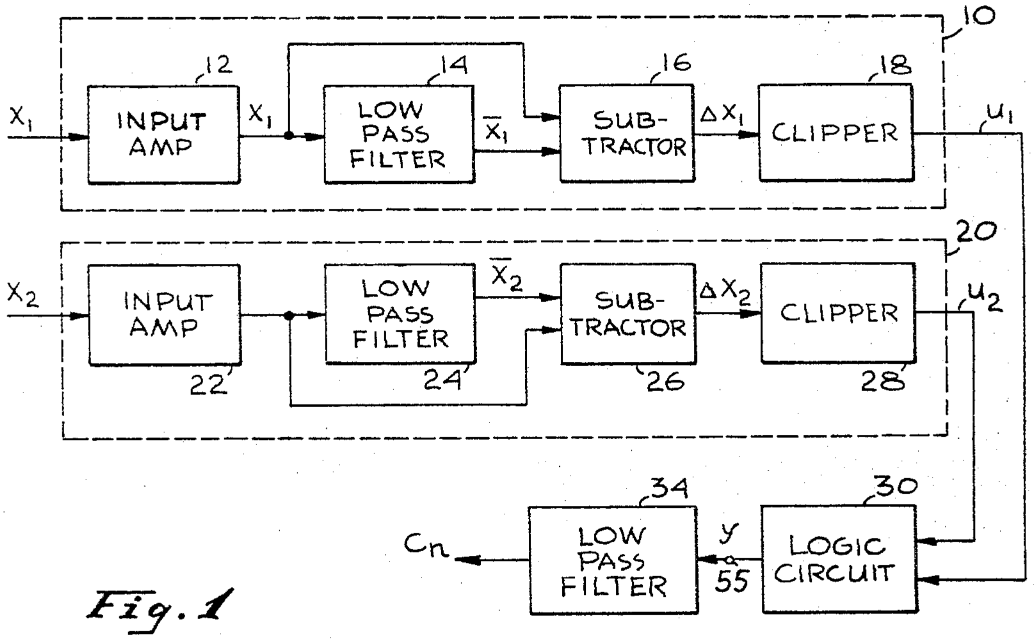

In various signal analysis applications it is often necessary to produce values which represent the correlation between related signals. For example, the cross-correlation at zero time shifts of two signals $X_1$ and $X_2$ at time $t$ may be expressed as $$C=\frac{\overline{[X_1(t)-\overline{X}_1][X_2(t)-\overline{X}_2]}}{\overline{[X_1(t)-\overline{X}_1]^2}\,\overline{[X_2(t)-\overline{X}_2]^2}} \qquad (1)$$

where the bars denote averages.

Implementing or computing the expression or Equation 1 by analog means is quite difficult, as a result of the required nonlinear operations of multiplication, squaring, square-rooting and division. The cost of the various analog circuits would be quite high. Also, such circuits would require periodic adjustments to prevent circuit drifts from affecting the accuracy of corrected value. The only operations which are conveniently realizable are subtraction and averaging.

It is therefore an object of the present invention to provide a relatively simple correlation computer.

Another object is to provide a correlation computer which does not incorporate costly nonlinear analog multiplication, squaring, square-rooting and division circuits.

A further object is to provide a correlation computer which provides a value related to the aforementioned expression without costly analog means.

Still a further object is to provide a relatively simple correlation computer which provides an approximate indication of the correlation between the fluctuations about some average values of two analog signals.

These and other objects of the invention are achieved by providing a correlation computer, producing a correlation value which is a close, sufficiently good approximation of the exact correlation value C hereinbefore defined. The approximated correlation value, hereafter designated $C_n$ is realizable with relatively simple easily adjustable circuits, so that the overall cost of producing and maintaining the correlation is greatly reduced.

Briefly, the correlation computer of the invention includes two signal channels, each responding to another input signal. Within each channel, the input signal is averaged over a selected time interval to provide an average signal from which the input signal is then subtracted. The difference signal represents a fluctuation about the average signal. The difference signal is supplied to a clipper circuit, which provides a signal of a fixed amplitude of a polarity which depends on the fluctuation polarity, i.e. whether the fluctuation about the average is positive or negative. The clipper output represents the signal channel output. The outputs of the two signal channels are supplied to a logic circuit which provides a signal of a constant magnitude but of a polarity which depends on whether the polarities of the outputs of the channels are the same or opposite to one another. The output of the logic circuit is supplied to an averaging circuit such as a low pass filter, the output of which represents the output of the computer of the present invention.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which.

Figure 2:
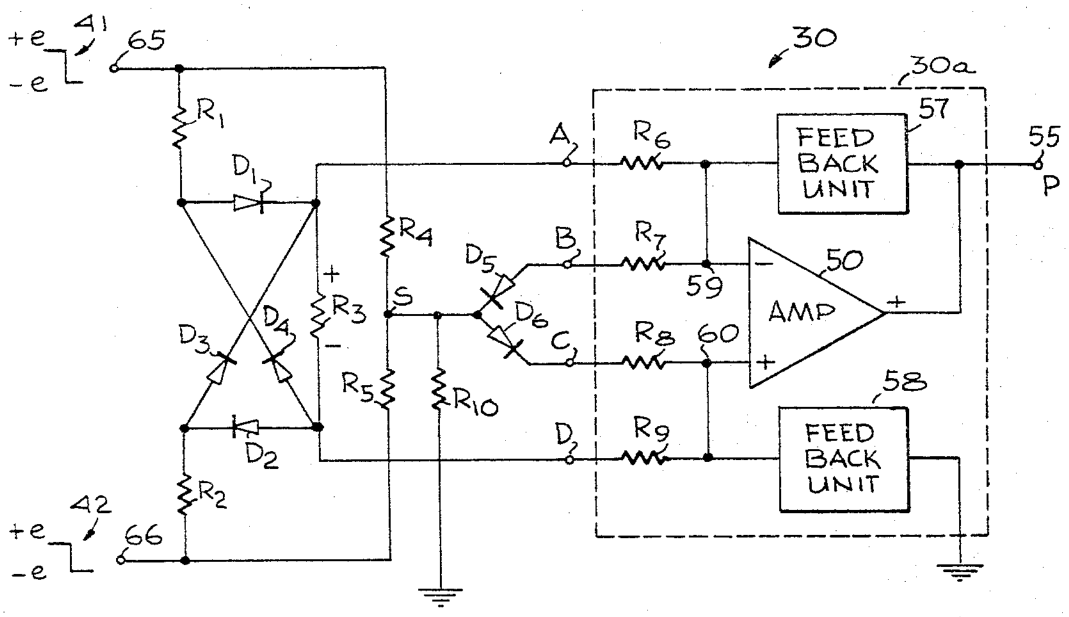

FIGURE 1 is a block diagram of the correlation computer of the present invention; and FIGURE 2 is a schematic diagram of one embodiment of a logic circuit shown in FIGURE 1.

Reference is now made to FIGURE 1 which is an overall block diagram of the correlation computer of the present invention. The computer includes two signal channels 10 and 20 to which are supplied two inputs $X_1$ and $X_2$ respectively. The signal $X_1$ may be supplied to an input amplifier 12 of channel 10, with the amplifier signal being supplied to an averaging circuit 14. The averaging circuit may comprise a low pass filter to provide an output designated $\overline{X}_1$ which represents the average of the signals supplied thereto from the amplifier 12 over a selectable time interval. For explanatory purposes only, the gain of amplifier 12 may be assumed to be 1 so that its output is $X_1$.

Channel 10 also includes a subtractor 16 which is supplied with the signal $X_1$ and the output of circuit 14, i.e. $\overline{X}_1$ to provide a difference signal $\Delta X_1$ which represents the fluctuation of the signal $X_1$ about its average. Designating the signal $X_1$ at a time $t$ as $X_1(t)$ and the average from circuit 14 as $\overline{X}_1$, the difference signal is $$\Delta X_1=X_1(t)-\overline{X}_1 \qquad (2)$$

The difference signal is positive with respect to a reference potential such as ground when $X_1(t)$ is greater than $\overline{X}_1$ and negative when the average signal $\overline{X}_1$ is the greater of the two, while the amplitude of $\Delta X_1$ is a function of the difference of the amplitudes of the two signals. The difference signal $\Delta X_1$ is supplied to a clipper 18, which, as appreciated by those familiar with the art, is conventionally operable to provide an output signal, designated $u_1$, of a fixed amplitude but of a polarity which is a function of the input thereof. For example, clipper 18 may be operable so that $u_1$ equals +1 volt whenever $\Delta X_1$ is positive, i.e. $X_1(t)$ is greater than $\overline{X}_1$ and −1 volt when $\overline{X}_1$ is greater than $X_1(t)$, irrespective of the amplitude of $\Delta X_1$. The output of $u_1$ represents the output of channel 10.

Channel 20, similar to channel 10, includes an averaging circuit 24 such as a low pass filter, a subtractor 26, and a clipper 28 which are analogous to circuits 14, 16 and 18 respectively. Channel 20 may also include an input amplifier 22 to amplify the input signal $X_2$ supplied to channel 20, prior to supplying it to filter 24 and subtractor 26. From the foregoing description, it should be appreciated that circuit 24 averages the input signal $X_2$ and provides an average signal $\overline{X}_2$, which is subtracted in subtractor 26 from the signal $X_2$ at time $t$, i.e. from $X_2(t)$ to provide the difference signal $\Delta X_2$. Clipper 28 is operable like clipper 26 so that when $\Delta X_2$ is positive, the output of clipper 28, designated as $u_2$, is +1 volt. while equaling −1 volt when $\Delta X_2$ is negative.

From the foregoing, it should be appreciated that the output signals $u_1$ and $u_2$ of channels 10 and 20 are of the same polarity either positive or negative only when the signals $X_1$ and $X_2$ vary from their averages in the same direction, i.e. both are greater or smaller than their averages. On the other hand, when the signals $X_1$ and $X_2$ vary from their averages in opposite directions, that is one is greater than its respective average and the other smaller, the polarities of $u_1$ and $u_2$ differ from one another.

In accordance with the teachings of the invention, the computer includes a logic circuit 30 which is energized by the output signals $u_1$ and $u_2$, each being either +1 volt −1 volt. When $u_1$ and $u_2$ are of the same polarity, i.e. both either +1's or −1's, the logic circuit provides an output signal $y$ of a positive polarity such as +7 volts. However, when $u_1$ and $u_2$ are of opposite polarities, i.e. one is a +1 volt and the other a −1 volt, the output signal $y$ is −7 volts. Thus, the polarity of the output signal of logic circuit 30 depends on the polarities of the two signals $u_1$ and $u_2$ supplied thereto. The logic circuit 30 may be thought of as an Exclusive-Or circuit with two inputs, providing a signal of a first polarity (+7 volts) when both inputs are the same and a signal of an opposite polarity (−7 volts) when the two inputs differ from each other.

From the foregoing, it should be appreciated that the output signal $y$ is a function of the relationship between the fluctuations of the two input signals ($X_1$ and $X_2$) of the two channels about their averages. Mathematically $y$ at time $t$ can be defined as $$\begin{aligned} y(t) &= sgn[X_1(t)-\overline{X}_1]sgn[X_2(t)-\overline{X}_2] \\ &= sgn\Delta X_1(t) sgn\Delta X_2(t) \end{aligned} \quad (3)$$

where $sgn$ is the signum sign or ±sign and $\Delta X_1(t)$ and $\Delta X_2(t)$ represent the difference signals at time $t$. The signal $y$ is average in an averaging circuit 34, the output of which is the desired approximated correlation value $C_n$, where $$\overline{C_n = sgn[X_1(t)-\overline{X}_1]sgn[X_2(t)-\overline{X}_2]} \quad (4)$$

The correlation value $C_n$ for many classes of signals, such as random telegraph waves and Gaussian signals has been found to be a sufficiently good approximation for the exact correlation C herebefore defined in Equation 1. As previously indicated, providing the exact correlation expression C would require complex and costly analog circuits to perform accurate multiplication, squaring, and square-rooting operations. However, the need for such circuits is overcome by the correlation computer of the present invention which provides a close enough approximation of the expression C with relatively simple digital and analog circuits. As seen from FIGURE 1 and the foregoing description, in the computer of the present invention, analog averaging operations are performed by the averaging circuits 14, 24 and 34, while subtractions are performed in subtractors 16 and 26. The rest of the operations may be thought of as digital in nature since clippers 18 and 28 convert the analog difference signals $\Delta X_1$ and $\Delta X_2$ into bipolar digital signals $u_1$ and $u_2$, operated upon in the logic circuit 30 which can be thought of as a digital circuit in that it responds to two bipolar digital signals ($u_1$ and $u_2$) and provides a bipolar signal $y$.

In one actual reduction to practice, the input amplifiers 12 and 22 comprise chopper-stabilized amplifiers with selectable gains of 0.1, 1, 10 and 100. The gain was selected so that the amplitudes of the signals to the circuits 14 and 24 varied between 0 and 10 volts. The averaging circuits 14 and 24 were low pass filters or finite time integrators with selectable time constants of 0.03, 0.1, 10 and 100 seconds so that the interval over which the two input signals $X_1$ and $X_2$ were averaged was adjustable. Clippers 18 and 28 were operated to provide 7.0 volts outputs either positive or negative depending on the polarity of the difference signals $\Delta X_1$ and $\Delta X_2$ respectively. When the outputs of the two clippers were both either +7.0 volts or −7.0 volts, the logic circuit 30 provided a +1 volt output while a −1 volt output was provided when the 7 volt outputs of the two clippers were of opposite polarities or signs. The output (±1 volt) of the logic circuit 30 was averaged in the averaging circuit 34 which was also a finite time integrator with an adjustable time constant. It was calibrated to provide a reading of +10 volts when the two signals to the logic circuit 30 were of the same polarity or sign during the entire integration period and −10 volts when the two quantities were never of the same sign during the same period. Intermediate readings indicated the degree of negative or positive correlation.

It should be appreciated that the teachings of the invention are not limited to the values hereinbefore presented for explanatory purposes only. Other signal relationships may be produced without departing from the spirit of the invention.

Attention is now directed to FIGURE 2 which is a schematic diagram of one embodiment of the logic circuit 30 shown in FIGURE 1. The circuit comprises an operational amplifier arrangement 30*a* comprising an operational amplifier 50, having its output connected to an output terminal 55 representing the output terminal of circuit 30. A feedback unit 57 is connected between the output terminal and an input terminal 59, while another feedback unit 58 is connected between a reference potential such as ground and another input terminal 60 of amplifier 50. Each of resistors $R_6$ and $R_7$ have one side thereof connected to input terminal 59, while the other sides thereof are connected to points designated A and B respectively. Similarly, each of resistors $R_8$ and $R_9$ are connected to input terminals 60 of amplifier 50 with the other ends thereof being connected to terminals designated C and D respectively. As is appreciated by those familiar with the art, arrangement 30*a* comprises an operation amplifier circuit referred to as an "adder-subtractor" or floating input combiner. When feedback units 57 and 58 are equal and resistive, then positive input signals at either terminal A or B result in an amplified inverted negative signal at output terminal 55. On the other hand, negative signals at either of terminals C or D results in an amplified non-inverted or negative signals at output terminal 55.

The logic circuit 30 also includes resistors $R_1$ through $R_5$ and $R_{10}$ as well as diodes $D_1$ through $D_6$ interconnected between the terminals A through D and terminals 65 and 66 which represent the input terminals of the logic circuit. Resistor $R_1$ is connected to input terminal 65 and to the anode and cathode terminals of diodes $D_1$ and $D_4$ respectively. The cathode of diode $D_1$ is connected to terminal A as well as to the cathode of diode $D_3$, while the anode of diode $D_4$ is connected to terminal D as well as to the anode of diode $D_2$. The cathode and anode terminals of diodes $D_2$ and $D_3$ are connected to one terminal of resistor $R_2$ having the other terminal thereof connected to the input terminal 66. A resistor $R_3$ is connected between the terminals A and D. Also, resistors $R_4$ and $R_5$ are connected in series between input terminals 65 and 66 with the junction thereof being connected to one terminal of resistor $R_{10}$, having the other terminal thereof connected to ground. The common junction of resistors $R_4$, $R_5$ and $R_{10}$ is connected to the cathode and anode terminals of diodes $D_5$ and $D_6$ respectively with the anode and cathode terminals of diodes $D_5$ and $D_6$ being connected to terminals B and C respectively.

This circuit in conjunction with the operation amplifier arrangement 30*a* produces a positive signal at output terminal 55 when the signal at terminals 65 and 66 are in phase, i.e. both are either positive or negative, while a negative signal is produced at terminal 55 when the signals at input terminals 65 and 66 are of opposite phase or polarity, hereafter also referred to as being in anti-phase. The signals at input terminals 65 and 66 are the outputs $u_1$ and $u_2$ of clippers 18 and 28, hereinbefore described in conjunction with FIGURE 1, while the output signal at terminal 55 represents the signal $y$.

As previously indicated, the signals $u_1$ and $u_2$ at input terminals 65 and 66 respectively are two state time varying signals, switching between two levels of amplitudes $+e$ volts and $-e$ volts with respect to a reference potential such as ground. When the signals at terminals 65 and 66 are at the same state, i.e. either $+e$ or $-e$, the junction point of resistors $R_4$ and $R_5$ will be at a potential with respect to ground of +K*e* or —K*e*, when $R_4=R_5$ and $$K=\frac{R_{10}}{R_{10}+R_4/2} \qquad (5)$$

When the potential at the junction point is positive, i.e. +K*e*, diode $D_6$ will conduct, connecting the junction point to the terminal C of arrangement 30*a*. The output therefore at the output terminal 55 will then be an amplified non-inverted positive signal +AK*e*, where A represents the gain of amplifier 50. If on the other hand, the junction point of resistors $R_4$ and $R_5$ is negative, i.e. —K*e*, diode $D_5$ will conduct connecting the junction point to terminal B of the arrangement 30*a*. Consequently, the output signal at the output terminal 55 will be amplified inverted signal +AK*e*.

It is thus seen that when the polarities of the two signals at input terminals 65 and 66 are the same, whether positive or negative, the signal at the output terminal 55 is the same, being +AK*e*. On the other hand, when the input signals at input terminals 65 and 66 are in anti-phase, i.e. one is +*e* and the other —*e*, the potential at the junction point of resistors $R_5$ and $R_4$ is zero and consequently there is no output at output terminal 55 due to the potential at input terminals B and C. The gain A of the operational amplifier arrangement 30*a* is controlled by the values of resistors $R_7$, $R_8$, and the feedback circuits 57 and 58, which hereafter will be represented by $Z_1$ and $Z_2$ respectively. The gain A can be expressed as $$A=\frac{Z_1}{R_7}=\frac{Z_2}{R_8} \qquad (6)$$

When the input signals at input terminals 65 and 66 are in anti-phase (+*e* and —*e* or —*e* and +*e*), diodes $D_1$, $D_2$, $D_3$, and $D_4$ operate as a bridge rectifier so that the potential at the terminal A is always positive and that at terminal D is always negative with respect to ground. The potentials at points A and D may be expressed as +K'*e* and —K'*e* when $R_1$ equals $R_2$ and $$K'=\frac{R_3}{R_1+R_3} \qquad (7)$$

The positive potential at point A results in an inverted amplified output at outer terminal 55 which equals —A'K'*e*

Similarly, the negative potential (—K'*e*) at point D results in a non-inverted amplified output at output terminal 55 which equals —A'K'*e*. The total output at the output terminal 55 is the sum of these two components and is therefore —2A'K'*e*. The gain of the operational amplifier arrangement 30*a* for the anti-phase signal is controlled by resistors $R_6$, $R_9$, and $Z_1$ and $Z_2$, so that $$A'=\frac{Z_1}{R_6}=\frac{Z_2}{R_9} \qquad (8)$$

In phase signals at input terminals 65 and 66 do not produce a potential difference across the bridge comprising of rectifiers $D_1$ through $D_4$. Consequently, no potential difference is developed across resistor $R_3$. If resistor $R_9$ is substantially greater than resistor $R_3$ and resistor $R_6$ is substantially greater than resistor $R_4$, then in the in-phase signal situation, the potentials at points A and D are both the same with respect to ground. Equal signals are therefore applied to both the inverting input A and the non-inverting input D of the operation amplifier arrangement 30*a*. Consequently, the resultant output at the output terminal 55 of this section of the logic circuit 30 is thus zero.

By suitably selecting the values of resistors $R_1$ through $R_{10}$, the positive and negative excursions of the output signal at the output terminal 55 may be controlled to be equal in magnitude. It should be pointed out however that the following equalities must be observed:

$$\begin{aligned} R_1&=R_2\\ R_4&=R_5\\ R_6&=R_9\\ R_7&=R_8\\ Z_1&=Z_2 \end{aligned} \qquad (9)$$

An adjustment to equalize the positive and negative excursions of the output signal at output terminal 55 can be easily accomplished by making resistor $R_1$ a variable or alternately making resistor $R_3$ a variable.

If feedback units 57 and 58, instead of being purely resistive, are made parallel combinations of resistors and capacitors, then the output signal at the output terminal 55 represents the average value of the phase difference between the signals at the input terminals 65 and 66, having a maximum amplitude when the two input signals are in phase and a minimum when the two input signals are out of phase for a particular time interval controlled by the resistive and capacitive values of the components in the feedback arrangements. Thus, in such an arrangement, the logic circuit 30 also includes the function performed by the low pass filter 34 hereinbefore described, so that the output signal at the output terminal 55 represents the approximated correlation value $C_n$.

There has accordingly been shown and described herein a novel correlation computer which provides an approximate value of the correlation between the fluctuations of two signals about their average values. The approximate correlation value is accomplished without resort to expensive and complex analog multiplication and division circuits by utilizing the original signals or functions and generating new functions whose correlation is relatively easy to determine. The new functions consist of a clipped version of each original function with its mean value removed. Normalization is accomplished by keeping the amplitudes of the functions independent of the original signal amplitude by means of clippers 18 and 28 (FIGURE 1).

It is appreciated that those familiar with the art may make modifications in the arrangements as shown without departing from the true spirit of the invention. Therefore, all such modifications and/or equivalents are deemed to fall within the scope of the appended claims.

What is claimed is:

1. A correlation circuit comprising:

first and second signal averaging means responsive to first and second input signals respectively for providing first and second averaged signals;

first means responsive to said first input signal and said first average signal for providing a first difference signal therebetween the polarity thereof being a function of the relative magnitudes of the signals supplied thereto;

second means responsive to said second input signal and said second averaged signal for providing a second difference signal therebetween the polarity thereof being a function of the relative magnitudes of the signals supplied thereto;

means responsive is said first and second difference signals for providing an output of a first polarity when said first and second difference signals have the same polarity and an output of a second polarity opposite said first polarity when said first and second signals are of opposite polarities; and third averaging means for providing an average of the outputs of said first and second polarities.

2. The correlation circuit defined in claim 1 wherein said first and second means comprise first and second subtractors respectively, each responsive to its respective input signal and average signal for providing a positive difference output signal when the average signal is greater than the input signal and a negative difference output signal when the average signal is smaller than the average signal.

3 The correlation circuit defined in claim 2 wherein said means responsive to said first and second difference signals includes first and second clippers responsive to the difference output signals of said first and second subtractors repectively each clipper providing a positive signal of a first amplitude when the difference signal of the subtractor is positive and a negative signal of said first amplitude when the difference signal is negative, said means further including logic circuitry responsive to the signals from said first and second clippers for providing a positive output of a second amplitude when the signals from said first and second clippers are both positive or negative and a negative output when one is positive and the other negative.

4. The correlator defined in claim 3 wherein each of said first, second, and third averaging means comprises a finite time integrator the output of said first and second integrators being first and second average signals of the first and second input signals supplied thereto, and the output of said third integrator representing the average of the positive and negative outputs of said logic circuitry of said second amplitude.

5. The correlation circuit defined in claim 3 wherein said logic circuitry includes an operational amplifier having first and second input terminals and an output terminals and an output terminal;

first resistive feedback means coupled between said first input terminal and said output terminal, second resistive feedback means coupled between said second input terminal and a reference potential; and resistive and diode means for coupling said first and second input terminals to said first and second clippers whereby said amplifiers providing a positive output when the signals from said first and second clippers are of the same polarity and a negative output when the signals from the clippers are of opposite polarities.

6. The correlation circuit defined in claim 5 wherein said resistive and diode means include first and second resistors each having one terminal connected to the first input terminal of said amplifier, third and fourth resistors each having one terminal connected to the second input terminal of said amplifier, a fifth resistor having one terminal connected to said reference potential, first and second diodes each having a cathode and an anode means connecting the anode of said first diode to said second resistor and the cathode to the other terminal of said fifth resistor means connecting the anode and cathode of said second diode to the other terminal of said fifth resistor and the other terminal of said third resistor respectively, and sixth and seventh resistors serially connected between the outputs of said first and second clippers, the junction between said sixth and seventh resistors being connected to the other terminal of said fifth resistor, whereby the polarity at said first input terminal of said amplifier is negative when the polarities of the output signals of said first and second clippers are negative and the polarity of the signal at the second input terminal of said amplifier is positive when the polarities of the output signals of both said first and second clippers are positive, said amplifier providing a positive output signal at the output terminal thereof, when the polarities of the signals at its first and second input terminals are negative and positive respectively.

7. The correlation circuit defined in claim 6 wherein said logic circuitry further includes a diode bridge circuit comprising four diodes and first, second, third and fourth terminals, the cathode and anode of two diodes being connected to each of said terminals;

means for connecting said first terminal to said first resistor and one terminal of an eighth resistor, means for connecting said second terminal to said fourth resistor and the other terminal of said eighth resistor, and means for connecting said third and fourth terminals to said first and second clippers respectively through ninth and tenth resistors whereby said amplifier provides a negative output signal at its output terminal when the output signals of said first and second clippers are of opposite polarities.

8. In a circuit for providing a value representative of the fluctuations of first and second input signals about their averages said circuit comprising:

first and second means responsive to said first and second input signals respectively, for providing first and second average signals representing the averages of said first and second input signals over a finite preselected time interval;

first difference signal producing means responsive to the first input signal and the first average signal for providing a first difference signal therebetween;

second difference signal producing means responsive to the second input signal and the second average signal for providing a second difference signal therebetween; and means responsive to said first and second difference signals for providing a value representative of the fluctuations of said first and second input signals about their averages in said preselected time interval.

References Cited

UNITED STATES PATENTS 3,163,750 12/1964 Lindsey et al. -------- 235—181

OTHER REFERENCES

Rosenheck: Detecting Signals by Polarity Coincidence, Electronics, Jan. 29, 1960, p. 67–69.

MARTIN P. HARTMAN, *Primary Examiner.*

FELIX D. GRUBER, *Assistant Examiner.*

U.S. Cl. X.R.

235—183, 193; 307—203, 216